United States Patent [19]

Vander Meer et al.

[11] 4,154,347

[45] May 15, 1979

[54] METHOD AND APPARATUS FOR PALLETIZING ARTICLES

[75] Inventors: Richard H. Vander Meer, Arvada; Robert L. Simmons, Lafayette, both of Colo.

[73] Assignee: Goldco Industries, Inc., Golden, Colo.

[21] Appl. No.: 857,719

[22] Filed: Dec. 5, 1977

[51] Int. Cl.² .............................................. B65G 57/03
[52] U.S. Cl. ........................................ 414/59; 53/540; 414/110; 414/753; 414/786
[58] Field of Search ............. 214/6 P, 6 N, 6 F, 6 FS, 214/6 TS, 152, 6 R, 6 M, 6 H, 1 BB, 1 BT; 53/540

[56] References Cited

U.S. PATENT DOCUMENTS

| 3,442,401 | 5/1969 | Wolfe et al. | 214/6 P |
| 3,612,299 | 10/1971 | Shaw et al. | 214/6 P X |
| 3,718,223 | 2/1973 | Meissner | 214/6 P X |
| 3,934,713 | 1/1976 | Vander Meer | 214/6 P X |
| 4,043,097 | 8/1977 | Ishida et al. | 214/6 M X |

*Primary Examiner*—Frank E. Werner
*Attorney, Agent, or Firm*—O'Rourke & Harris

[57] ABSTRACT

Method and apparatus for palletizing articles delivered by an accumulator belt onto a pallet in transverse rows of alternating orientation, with the first and last transverse rows of each tier of articles on the pallet being of the same orientation, such palletization being accomplished by engaging and lifting the transverse row of an appropriate orientation which immediately follows the last transverse row of a first tier, loading a second tier of articles with the transverse row immediately following the lifted transverse row forming the first transverse row of such tier, reforming the lifted transverse row into a transverse row of the appropriate orientation by side shifting, and inserting the reformed lifted transverse row as the initial transverse row of a third tier of articles.

18 Claims, 9 Drawing Figures

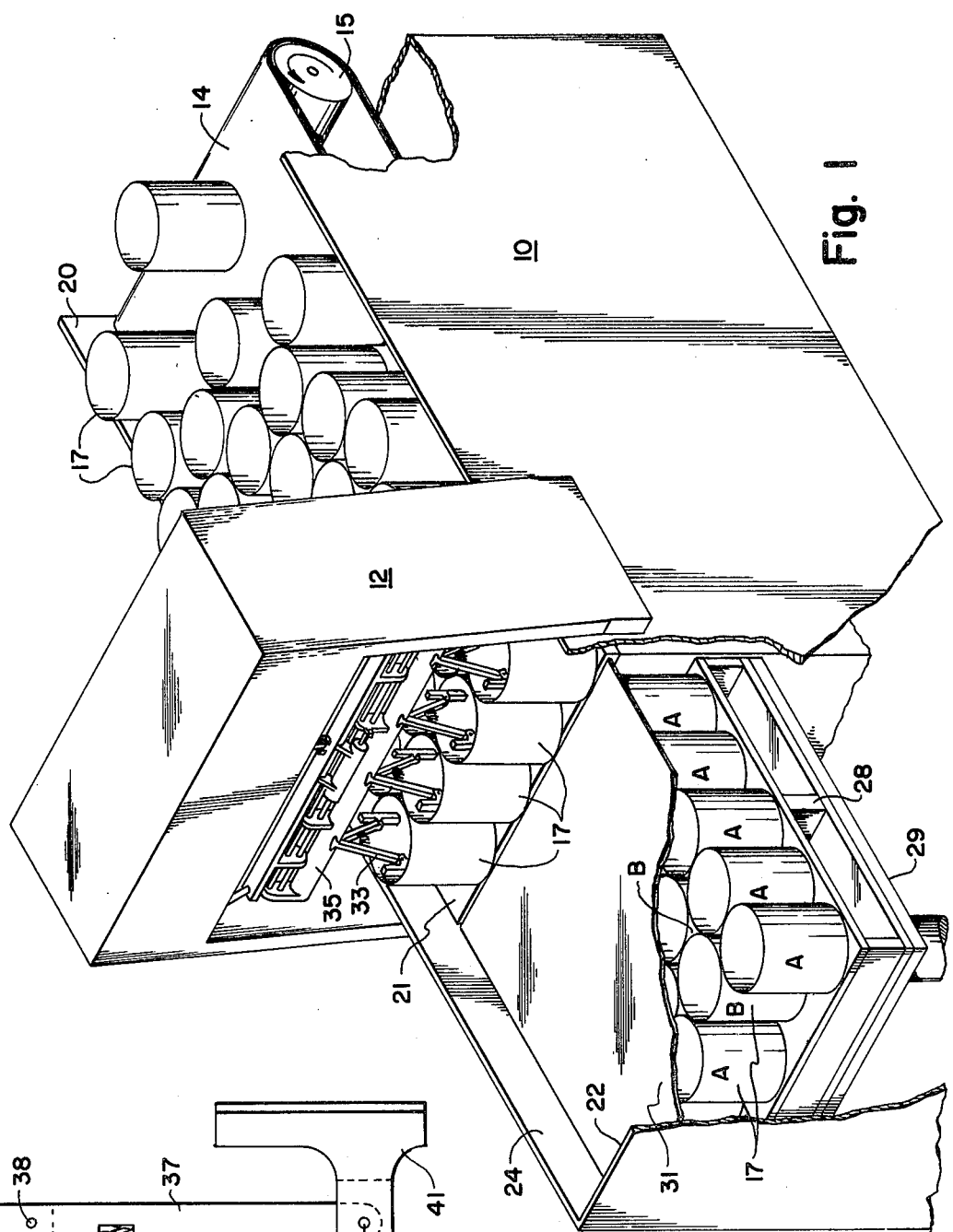
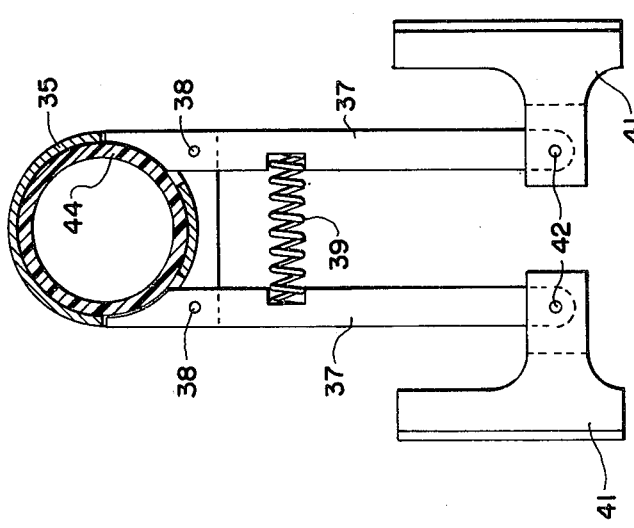

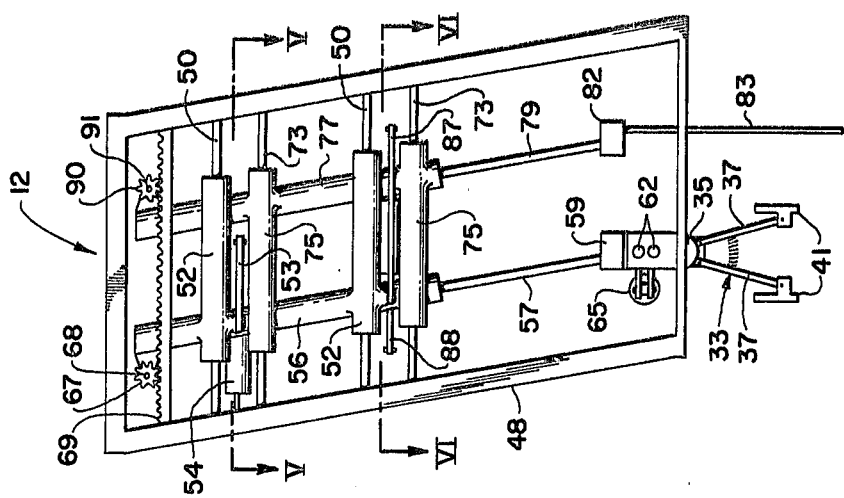
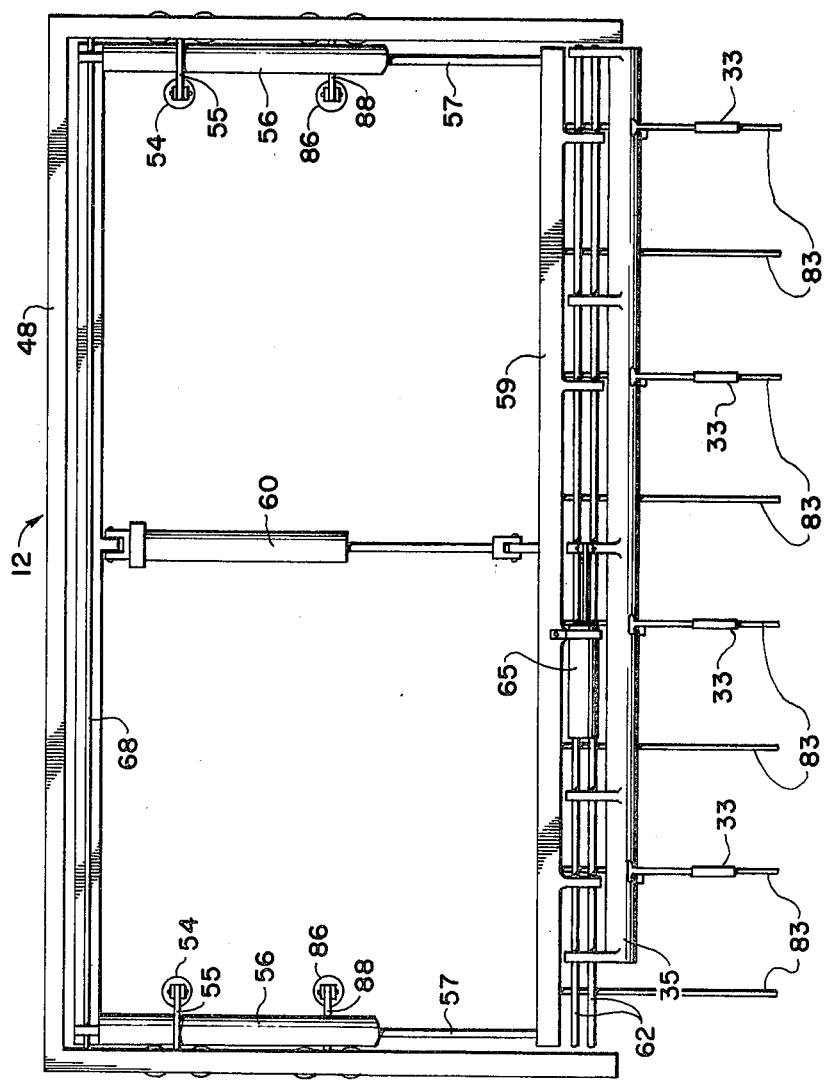
Fig. 3
Fig. 4

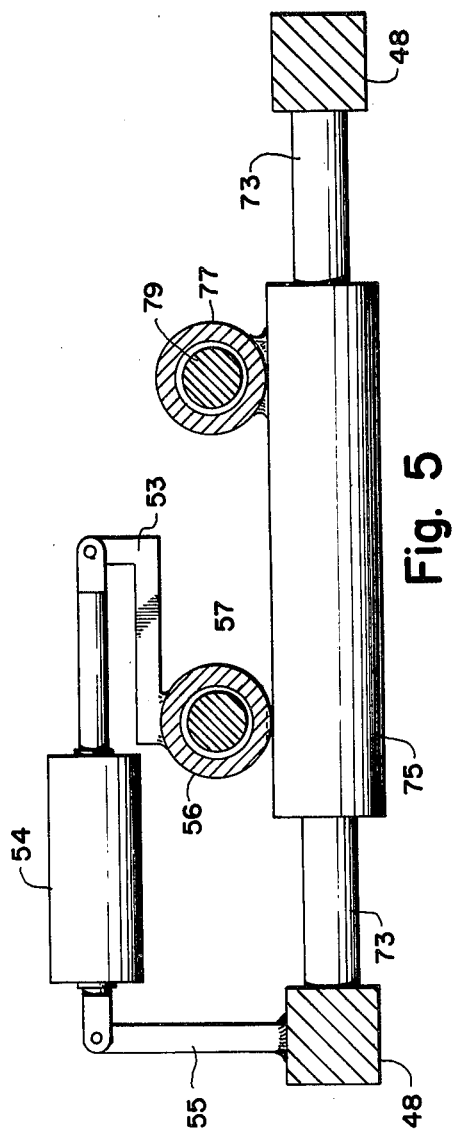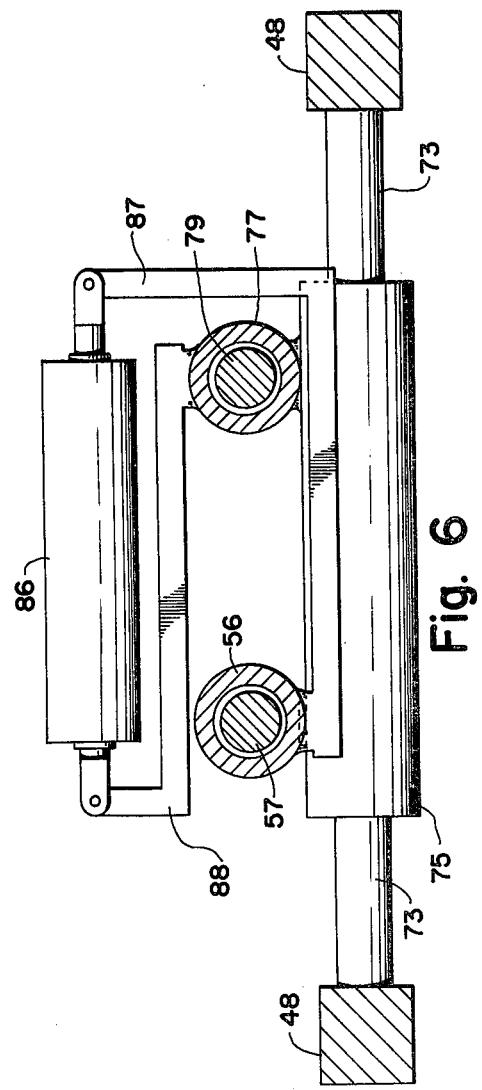

METHOD AND APPARATUS FOR PALLETIZING ARTICLES

BACKGROUND OF THE INVENTION

1. Field of the Invention

The present invention relates generally to the palletization of articles into vertical tiers, and more particularly to a method and apparatus for so palletizing articles with the initial and final transverse rows in each tier being of the same orientation, i.e., of a Number One Stagger arrangement.

2. Description of the Prior Art

It is well known to palletize articles such as cans, bottles and other such cylindrical or curvilinear containers into vertical stacked tiers of such articles on a pallet. Generally, this involves an accumulator belt which delivers the articles to a tier forming area. The articles form transverse rows of differing, usually alternating orientations. Accordingly, the natural arrangement of a tier is to form the initial transverse row in the tier of one orientation and final row of the other orientation, or to form adjacent tiers of differing orientations. Since the transverse row immediately following the last transverse row of a given tier is the first loaded transverse row of the subsequent tier, the reason for such result is readily apparent.

It has heretofore been recognized that a so called Number One Stagger is in many instances desirable. A Number One Stagger contemplates that all tiers are essentially identically formed, in that the first formed and last formed transverse row in each stagger are of the same orientation. Heretofore, the inherent problem in producing palletized loads with a Number One Stagger have been coped with by laterally removing the inappropriately oriented transverse row, either at the plate immediately adjacent the accumulator belt, or at the end of the tier forming area. The removed transverse row would then be conveyed by an auxiliary conveyer against the flow of cans on the accumulator belt and redeposited on the accumulator belt in a manner analogous to that in which newly arrived articles are deposited. In addition to the expense and problem of providing additional conveying apparatus, such removal of articles often requires a longer time period than that required to lower the palletizer elevator. Accordingly, the speed of palletization of such articles is adversely affected.

SUMMARY OF THE INVENTION

The present invention, which provides a heretofore unavailable improvement over previous palletizing apparatus and methods comprises an arrangement to secure and vertically lift the improperly oriented transverse row of articles, reorient the articles as the appropriate initial or final transverse row of a tier, and reinsert the articles as an initially formed transverse row of a following tier of palletized articles. The apparatus is compatible with most palletizing apparatus. In addition to providing means for lifting the articles, the standard gate or plunger mechanism is also modified to serve the additional function of parting the transverse rows to permit the realigned, transverse row to be replaced in the can pattern. However, the total modification required for the novel method and apparatus of the instant invention to accomplish the formation of tiers of palletized articles in a Number One Stagger arrangement is much simpler than the prior art configurations.

Accordingly, an object of the present invention is to provide a new and improved method and apparatus for forming palletized loads of articles in which the tiers in the pallet load are configured in a Number One Stagger.

Another object of the present invention is to provide a new and improved method and apparatus for forming palletized loads having a Number One Stagger which avoids delays in the continuous palletization of articles.

Yet another object of the present invention is to provide a new and improved method and apparatus for palletizing articles in a Number One Stagger configuration which requires no additional conveying apparatus and does not recycle articles back to the accumulator belt.

Still another object of the present invention is to provide a new and improved method and apparatus for palletizing articles with a Number One Stagger configuration which is suitable to use with existing palletizing equipment.

These and other objects of the present invention will be apparent from the following description.

BRIEF DESCRIPTION OF THE DRAWINGS

In the drawings:

FIG. 1 is a somewhat simplified, perspective view of a palletizing apparatus in accord with the instant invention including the means for forming the articles in a Number One Stagger arrangement.

FIG. 2 is a sectioned view through the support of a grabbing means in accordance with the instant invention.

FIG. 3 is a side view of the novel apparatus in accord with the instant invention;

FIG. 4 is a front view of the novel apparatus in accord with the instant invention;

FIG. 5 is a sectional view along line V—V of FIG. 3;

FIG. 6 is a sectional view along line VI—VI of FIG. 3;

DETAILED DESCRIPTION OF THE INVENTION

Figure 9:
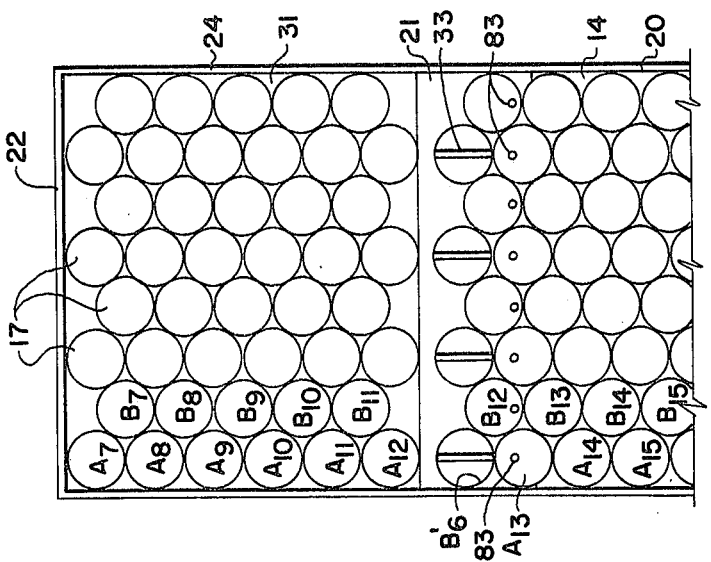
FIG. 9 is a simplified top view similar to that of FIG. 8 illustrating the insertion of the reformed transverse row of articles.

Turning now to the drawings, wherein like components are designated by like reference numerals throughout the various figures, a conventional palletizer for forming stacked tiers of articles is illustrated in a simplified manner in FIG. 1 and generally designated by the reference numeral 10, with row ordering device 12 in accordance with the instant invention attached thereto. As shown, palletizer 10 includes accumlator belt 14 carried for instance, on roller 15. Cans 17 transported by accumulator belt 14 are confined by side fence 20 adjacent accumulator belt 14. Thus cans 17, when unrestricted, flow from accumulator belt 14 over fixed plate 21 until restricted by end fence 22 and pallet side fence 24 to form a tier of cans 17 on, for instance, pallet 28 carried on elevator 29. When a tier of cans 17 is formed, flow of cans from accumulator belt 14 is terminated, as will be described below, elevator 29 is moved downwards in increments equal to essentially the height of a can 17, and a divider sheet 31 placed on top of the cans to accept yet another tier of articles.

As will be noted, the cans forming the tiers are present in transverse rows of two different orientations, i.e., "A" and "B" as a result of the nesting of adjacent rows of cans 17. In order to provide a Number One Stagger when forming tiers of cans 17, can lifting means 33 carried by support 35 are provided. The details of can lifting means 33 will be apparent with reference to FIG. 2. As illustrated, adjacent arms 37 are supported at arm pivots 38 to provide articulation between arms 37 and support 35. Spring 39 is positioned between arms 37 to bias arms 37 into a diverging relationship. Can engaging members 41 are positioned at the bottom of each of arms 37 and secured thereto by pivots 42. Pneumatic bladder 44 is positioned within support 35 and connected to a source of pressurized air (not shown). When expanded, bladder 44 overcomes the bias of spring 39 to move arms 37 into a retracted configuration. Upon release of the pressurized air from pneumatic bladder 44, spring 39 resiles and again extends arms 37.

Though can lifting means 33, as illustrated and described above, is a preferred expedient, numerous other functionally equivalent means, i.e., vacuum members, magnetic members, etc. may be employed to lift cans 17.

The function of can lifting means 33, and row ordering device 12, as a whole, will be readily understood with reference to FIGS. 3 and 4. As shown, frame 48 is provided to support device 12 on palletizer 10. Guide rods 50, carrying linear bearings 52 are provided to facilitate selective reciprocal movement of can lifting means 33 parallel to the direction of travel of accumulator belt 14. Pneumatic cylinders 54, connected also to frame 48, activate movement, and specifically move substantially vertical guide sleeves 56. Support rods 57, movably engaged in guide sleeves 56 are connected to transverse mount 59. Links 53 and 55 attach pneumatic cylinders 54 to frame 48 and vertical guide sleeves 56 as shown in FIG. 5. Actuator cylinder 60 is connected also to transverse mount 59 and provides for vertical reciprocal movement of transverse mount 59 by movement of mounting rods 57 within support sleeves 56.

Support 35, which carries can lifting means 33 as discussed above, is slidably secured to transverse mount 59 by means of rod members 62. Actuator 65 is provided to "side shift" or move can lifting means 33 laterally. Thus, lifting means 33 may be selectively positioned in the "A" or "B" orientation. Spur gears 67, carried on shaft 68, are journaled to vertical mounting sleeve 56 and carried in rack member 69 to maintain alignment of vertical support sleeves 56 when moving on support rods 50.

From the above description, it is apparent that lifting means 33 may be independently moved in three axes, i.e., by activation of pneumatic cylinder 54 to induce movement parallel to the direction of movement of accumulator belt 14, by activation of actuator cylinder 60, to provide substantially vertical movement, or movement of actuator 65, to laterally position lifting means 33. Movement parallel to the direction of travel of accumulator belt 14 is optional since lifting means 33 removes and replaces cans 17 at the same position along this axis of movement. However, it is preferable to provide for such movement to facilitate the forward positioning of a plunger carriage assembly described below. Taken collectively, the above-described mechanisms for accomplishing these movements will hereafter be referred to as the can lifting means carriage assembly.

Also carried by frame 12 is a plunger carriage assembly similar in many respects to the can lifting means carriage assembly. More specifically, plunger guide rods 73, analogous to the above-described guide rods 50, carry plunger linear bearing 75. Plunger vertical guide means 77 are secured to plunger linear bearings 75 and received plunger support rod 79. At the lower terminus of plunger support rod 79 is carried plunger transverse support 82 from which a plurality of plungers 83 depend. As illustrated, and as will be explained in more detail below, plungers 83 are configured to engage a transverse row in either the "A" or "B" configuration. Alternatively, only half the number of plungers 83 may be included and a "side shifting" mechanism essentially identical to that described above with regard to the can lifting means carriage assembly may be incorporated at plunger transport support 82 to permit plungers 83 to be side shifted to engage either an "A" transverse row or a "B" transverse row.

Pneumatic cylinder 86 is connected to vertical guide sleeves 56 by link 87, at one end, and to plunger vertical guide means 77 by link 88 at the other end, as shown in FIG. 6. Accordingly, when only pneumatic cylinder 54 is activated, both the can lifting means carriage assembly and the plunger carriage assembly are moved on guide rods 50 and plunger guide rods 73. The two carriage assemblies move in unison. However, when pneumatic cylinder 86 is activated, plunger carriage assembly moves towards or away from the can lifting means carriage assembly for reasons which will be described below. Spur gear 90 mounted on shaft 91 is connected to plunger vertical guide means 77 for purposes identical to that described with regard to spur gear 67 journaled to the can lifting means carriage assembly.

Figure 8:
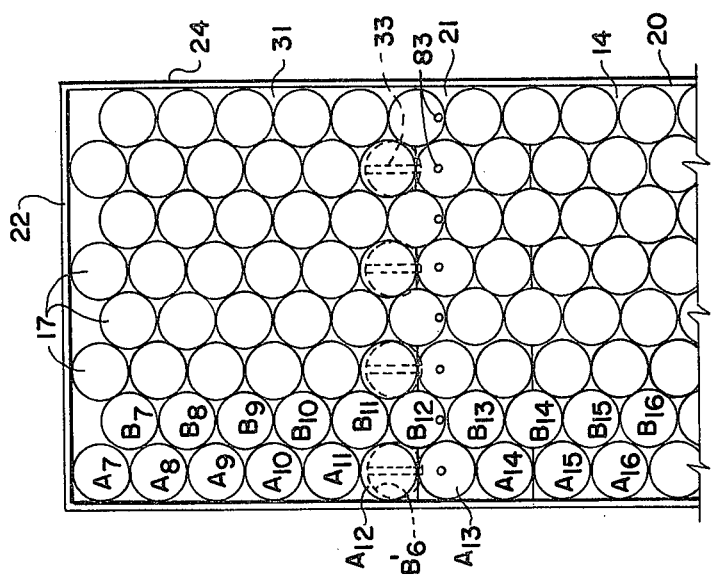
FIG. 8 is a simplified top view of the formation of the subsequent tier of articles after that tier illustrated in FIG. 7.
Figure 7:
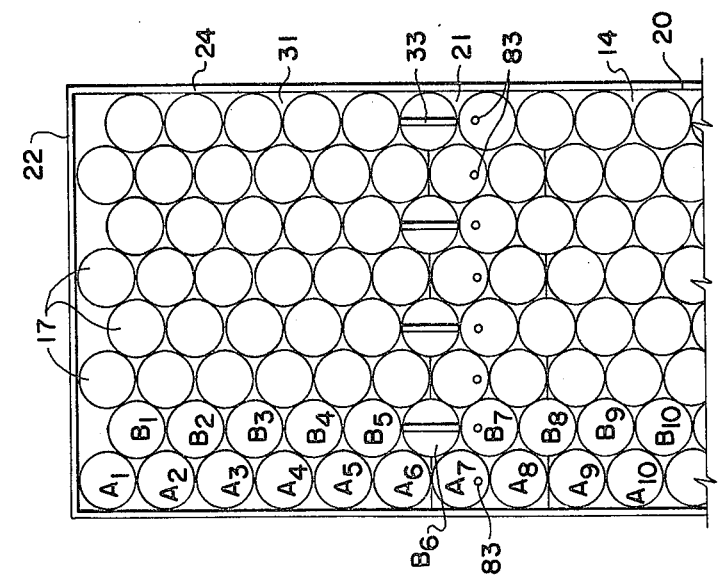
FIG. 7 is a simplified top view of articles being formed into a tier.

The specific operation of the above-described palletizing apparatus can and row control device 12 will be more readily understood with reference to FIG. 7, FIG. 8, and FIG. 9. As shown in FIG. 5, an initial tier of cans 17, i.e., transverse rows $A_1$ through $A_6$, and transverse rows $B_1$ through $B_5$, have been positioned on divider sheet 31. Transverse rows $A_1$ and $A_6$ constitute the first and last transverse rows on divider sheet as illustrated in FIG. 7. Transverse row $B_6$, on plate 21, which normally would constitute the first transverse row of the succeeding tier of cans 17, are engaged by can lifting means 33. Plungers 83 are inserted in transverse row $A_7$ to prevent movement of cans 17 while elevator 29 is lowered and divider sheet 31 inserted. Plungers 83 may, in some instances, move transverse row $A_7$ away from transverse row $B_6$ to permit transverse row $B_6$ to be lifted.

As shown in FIG. 8, row $B_6$ has been lifted (as indicated in ghosted fashion) side shifted to form $B'_6$ which is in effect in a transverse row of "A" configuration and suspended over the cans 17 being transported. Accordingly, when plungers 83 are withdrawn, row $A_7$ constitutes the first transverse row of the next tier as illustrated in FIG. 8. Plungers 83 are then inserted into cans 17 constituting transverse row $B_{12}$. As shown in FIG. 9, row $B_{12}$, and the cans 17 upstream thereof are moved against the direction of travel of accumulator belt 14 by moving plungers 83. This is accomplished by extending pneumatic cylinders 86 as described in FIGS. 3 and 4. Then, row $B'_6$ i.e., the lifted transverse row reformed into an "A" orientation, is deposited adjacent row $B_{12}$ and released by can lifting means 33. Accordingly, row $B'_6$, will constitute the properly oriented first transverse row in the tier of cans 17 next following that tier shown in FIG. 9. Thereafter, the cycle is repeated in the manner above described.

Put succinctly, after a tier of articles is formed with the first and last transverse rows forming the tier of the same configuration, the next transverse row on the plate is engaged and lifted vertically from the transverse rows of articles. A subsequent tier of articles is then formed again with an appropriate first and last transverse row. The lifted transverse row is side shifted to reorient the lifted articles to a configuration appropriate for the first row of a yet subsequent tier, the transverse rows on the plate adjacent the divider sheet are moved against the normal directional flow, to create a transverse opening and the reconfigured tranverse row inserted into the transverse opening to be palletized as the first tranverse row on yet the third tier of articles. Thus a transverse row is vertically withdrawn to provide a Number One Stagger at one tier of articles, and side-shifted and reinserted to provide a Number One Stagger for the next tier of articles. Accordingly, there is no requirement to delay palletization, since the articles in the lifted transverse row may be reformed and reinserted well within the short time period required to lower the elevator one increment. Further, the need to reconvey these articles to a vacant portion of the accumulator sheet is avoided.

Other specific features of the mechanism are substantially conventional and well within the skill of the art. For instance, micro switches positioned at the end of travel of the various portions of the can lifting means carriage assembly and plunger carriage assemblies may be engaged to activate the subsequent desired movement as described above. Such timing is essentially the means by which timing of conventional palletization step is accomplished. Alternatively, other timing means, such as a microprocessor, may be employed to activate the barrier movements. Of course, solenoids, hydraulic cylinders or other such conventional motion inducting mechanisms may be employed rather than the above-described pneumatic cylinders. Gate means other than plungers may be employed.

While only one particular useful detailed embodiment of the invention has been described and illustrated, it is expected that those skilled in the art will recognize various changes and modifications to the described and illustrated embodiment and that changes may be utilized without departing from the scope of the invention as defined by the following claims.

What is claimed is:

1. Apparatus for palletizing articles into vertically spaced tiers with each tier being formed in a pattern of transverse rows of varying orientation the apparatus comprising:
   an accumulator belt for conveying articles;
   a loading area defined adjacent the end of the accumulator belt;
   elevator means positioned at or below the loading area to receive articles from the conveyor belt onto the loading area;
   fence means to confine articles to the accumulator belt and the loading area;
   gate means movably mounted above and adjacent to the accumulator belt and the loading area;
   means for selectively moving the gate means in a reciprocal manner parallel to the direction of movement of the accumulator belt;
   means for selectively moving the gate means towards and away from the plane of the accumulator belt with a substantial component of the movement being normal to the accumulator belt;
   article lifting means movably mounted above and adjacent to the accumulator belt and loading area, the article lifting means being positioned closer to the loading area than are the gate means;
   means for selectively moving the article moving means towards and away from the plane of the accumulator belt with a substantial component of the movement being normal to the accumulator belt; and
   means to reciprocally side shift the article lifting means laterally relative to the direction of travel of the accumulator belt, whereby upon formation of a tier of articles at the loading area, the next following tranverse row of articles may be engaged by the article lifting means, lifted vertically, side shifted to form a tranverse row configuration other than that initially presented, the gate means withdrawn to permit another tier of articles to be formed after the elevator means is lowered an increment, and the lifted transverse row reinserted after the gate means is lowered and moved against the direction of travel of the accumulator belt to provide an opening for the lifted transverse rows of articles thus producing a Number One Stagger in articles in the tiers.

2. Palletizing apparatus as set forth in claim 1 in which the article lifting means further comprise means for reciprocally moving the article lifting means parallel to the direction of travel of the accumulator belt.

3. Palletizing apparatus as set forth in claim 1 in which the gate means comprise a plurality of plunger members substantially equidistantly spaced and positioned substantially perpendicular to the plane of the accumulator belt.

4. Palletizing apparatus as set forth in claim 3 in which the number of plunger members corresponds to the number of articles in a transverse row.

5. Palletizing apparatus as set forth in claim 3 in which the number of plunger members corresponds to the total number of articles in two adjacent transverse rows.

6. Palletizing apparatus as set forth in claim 1 in which the gate means comprise substantially equidistantly spaced plunger members positioned substantially perpendicular to the plane of the accumulator belt, the plunger members being of a number corresponding to the number of articles in a transverse row, and the gate means further including means for selectively side shifting the plunger members laterally relative to the direction of travel of the accumulator belt, whereby the plunger members may be positioned to engage articles in adjacent transverse rows of differing orientation.

7. Palletizing apparatus as set forth in claim 1 in which the article lifting means comprise a pair of articulated arms and means for selectively moving the arms into an expanded position and into a retracted position, whereby the arms may be inserted through the open top of an article and expanded to internally engage and lift the article.

8. Palletizing apparatus as set forth in claim 7 in which the can lifting means further comprise resilient biasing means positioned between the arms to urge the arms into an expanded position, and a pneumatic bladder engaging the arms, whereby the bladder may be expanded pneumatically to overcome the biasing means and retract the arms.

9. Apparatus for palletizing articles into vertically spaced tiers with each tier being formed in a pattern of transverse rows of varying orientation, the apparatus comprising;
an accumulator belt movable in a determinable direction for conveying articles;
fence means adjacent opposed sides of the accumulator belt for confining articles to the accumulator belt;
loading area fence means positioned adjacent the terminus of the accumulator belt and defining a loading area for receiving transverse rows of articles and forming such articles into tiers;
elevator means positioned below the loading area to support tiers of articles formed at the loading area;
gate means carried on a gate means carriage assembly, the gate means carriage assembly being mounted for selective and independent movement of the gate means both reciprocally in a direction parallel to the direction of travel of the accumulator belt, and also for reciprocal movement with a substantial component of movement normal to the plane of the loading area; and
article lifting means carried on an article lifting means carriage assembly, the carriage assembly being movably mounted relative to the loading area for selective and independent movement reciprocally with a substantial component of movement normal to the plane of the loading area, and also for reciprocally side shifting the article lifting means laterally to the direction of movement of the accumulator belt.

10. Palletizing apparatus as set forth in claim 9 in which the article lifting means further comprise means for reciprocally moving the article lifting means parallel to the direction of travel of the accumulator belt.

11. Palletizing apparatus as set forth in claim 9 in which the gate means carriage assembly comprises a plurality of gate guide rods fixedly mounted relative to the loading area and oriented substantially parallel to the direction of travel of the accumulator belt, a plurality of gate linear bearings slidably mounted one each on each of the gate guide rods, at least two gate vertical guide means carried one each on at least two of the gate linear bearings, gate support rods movably mounted one each in each of the vertical guide means also carrying the gate means, means for moving the gate linear bearings relative to the article lifting means carriage assembly mounted between the article lifting means carriage assembly and the gate means carriage assembly, and means for vertically moving the gate means operably connected to the gate support rods.

12. Palletizing apparatus as set forth in claim 11 further including means for reciprocally side shifting the gate means relative to the gate support rods and the direction of travel of the accumulator belt.

13. Palletizing apparatus as set forth in claim 9 in which the article lifting means carriage assembly comprises a plurality of guide rods fixedly mounted relative to the loading area and oriented substantially parallel to direction of travel of the accumulator belt, a plurality of linear bearings slidably mounted one each on each of the guide rods, at least two vertical guide means carried one each on at least two of the linear bearings, support rods movably mounted one each in each of the vertical guide means, the support rods carrying means for reciprocally side shifting the article lifting means laterally to the direction of travel of the accumulator belt means, means for moving the linear bearings relative to the loading area, and means for vertically moving the article lifting means operably connected to the support rods.

14. A method for palletizing articles comprising:
conveying a plurality of articles on an accumulator belt;
forming the articles into transverse rows with adjacent transverse rows of articles having differing orientation;
forming a first tier of articles at a loading area adjacent the terminus of the accumulator belt with the first transverse row and last transverse row of articles forming such first tier being of the same orientation;
securing lifting means to each of the articles in the transverse row of articles next upstream from the last transverse row of articles of the first tier;
positioning gate means to restrain movement of the transverse row of articles next upstream from the transverse row of articles engaged by the lifting means;
lowering the first formed tier of articles to provide a surface adjacent the upper portion thereof for receiving the next, second formed tier of articles;
lifting the transverse row of articles secured by the lifting means above the articles carried on the accumulator belt;
releasing the transverse row of articles engaged by the gate means with such transverse row of articles constituting the first transverse row of articles of the second tier of articles;
forming a second tier of articles with the first and last transverse rows of articles of such tier being of the same orientation as the first formed tier;
engaging the transverse row of articles next upstream from the last transverse row of articles forming the second tier with the gate means to restrain movement of such transverse row of articles;
moving the engaged transverse row of articles against the direction of travel of the accumulator belt to define an opening;
laterally moving the lifted transverse row of articles to reform the transverse row of articles into the opposite orientation to that of the initial orientation of such transverse row of articles;
lowering the second formed tier of articles to provide a surface adjacent the upper portion thereof for receiving the next, third formed tier of articles;
inserting the reoriented transverse row of articles into the opening created by the movement of the engaged transverse row of articles; and
releasing the reinserted, lifted transverse row of articles and the engaged transverse row of articles to form a third tier of articles with the first and last transverse rows of articles of such tier being of the same orientation as those of the first formed tier and the second formed tier.

15. A method for palletizing articles as set forth in claim 14 in which the articles are open-topped articles, and the articles are restrained by the gate means by inserting plungers into the open top of the articles to engage the articles.

16. A method for palletizing articles as set forth in claim 15 in which the number of plungers disposed on the gate means corresponds to the number of articles in a transverse row of articles, and further including the step of laterally side shifting the plungers from the position at which the gate means restrains movement of the transverse row of articles next upstream from the transverse row of articles engaged by the lifting means, to the position at which the gate means engages the transverse row of articles next upstream from the last transverse row of articles forming the second formed tier of articles.

17. A method for palletizing articles as set forth in claim 14 in which the articles are open-topped articles and an article is secured for lifting by inserting lifting means in the form of articulated arms into the open-top of the article and expanding the articulated arms to engage the article, and the articles are released by retracting the arms to disengage from the article.

18. A method for palletizing articles as set forth in claim 14 in which the transverse row of articles next upstream from the transverse row of articles secured by the lifting means is moved against the direction of movement of travel of the accumulator belt before the transverse row of articles secured by the lifting means is lifted.

* * * * *